Figure 1:
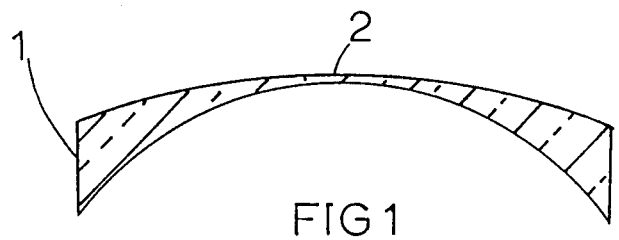

United States Patent [19]

Neefe

[11] Patent Number: 4,615,593
[45] Date of Patent: Oct. 7, 1986

[54] FLUORESCENT NON-OPTICAL CORNEAL COLOR CHANGE DEVICE

[76] Inventor: Charles W. Neefe, 811 Scurry St., P.O. Box 429, Big Spring, Tex. 79720

[21] Appl. No.: 766,984

[22] Filed: Aug. 19, 1985

Related U.S. Application Data

[63] Continuation-in-part of Ser. No. 751,484, Jul. 3, 1985.

[51] Int. Cl.$^4$ .......................... G02C 7/04; D06P 5/00
[52] U.S. Cl. .............................. 351/162; 351/160 H; 8/507
[58] Field of Search .............. 351/160 H, 160 R, 161, 351/162; 8/507

[56] References Cited

U.S. PATENT DOCUMENTS 3,189,914  6/1965  Gusewitch et al. ............ 351/162 X
4,157,864  6/1979  Koller et al. .................... 351/160 H Primary Examiner—John K. Corbin
Assistant Examiner—Scott J. Sugarman

[57] ABSTRACT

A non-optical cosmetic device for changing the apparent color of the eye. The colored cosmetic device has a central visual aperture and surrounds the pupil of the eye. Fluorescent pigments are added to the final monomer before being polymerized to form the soft hydrophilic material. Daylight illumination activates the fluorescent pigments which radiate light of the desired color. The colored fluorescent light radiated from the cosmetic device changes the apparent color of the eye.

12 Claims, 4 Drawing Figures

FLUORESCENT NON-OPTICAL CORNEAL COLOR CHANGE DEVICE

This is a continuation in part of patent application Ser. No. 751,484 filed July, 03, 1985 entitled; "SPIN CAST LENS WITH CENTRAL APERTURE."

The desire to change and enhance the apparent color of the eye was recorded by the Egyptians five thousand years ago. Cosmetic makeup for the eye area accounts for the larger percentage of the cosmetic sales.

PRIOR ART

Several contact lenses have been produced in an effort to achieve cosmetic eye color change.

One attempt employed a laminated structure with a painted opaque plastic member. The result was a thick heavy lens which was difficult to fabricate and difficult to wear. A later attempt employed a colored opaque porous member surrounding a clear cylinder from which the lens was cut by lathing. This resulted in a lens having a pupil and iris pattern and the porous member had tendencies to flake and chip at the edge. (U.S. Pat. No. 3,454,332—Siegel). A third generation of colored lenses provided a thin layer of colored opaque markings placed in a clear material. The opaque colored markings radiated from the center of the clear material in a geometric pattern.

U.S. Pat. Nos. Neefe 3,710,796; 3,760,807; 3,786,812 and 3,957,049 describe methods of corneal drug delivery using corrective contact lenses.

STATE OF THE ART

The manufacture of plano or zero power contact lenses is most difficult and expensive. A solution has been found by an ocular device with central visual aperture. The visual aperture being from 4.0 milimeters to 7.0 milimeters in diameter surrounded by a circular hydrogel material. The edges of the central aperture are tapered on the convex surface thereby thinning the device around the aperture. This thinning of the aperture edge is necessary to prevent the tear miniscus formed by surface tension at the aperture edge. The edge thinning also provides a comfortable device and minimum of foreign body sensation as the eyelid travels over the aperture during the blink.

The opening at the center to the atmosphere prevents hypoxia and the formation of corneal edema. The non-refraction open aperture device can be tolerated for extended periods of time without the edema problems encountered with refractive lenses. The materials used are stronger and more durable since no consideration of oxygen permeability is required. The aperture device may be tinted by dying or by adding colorant to the liquid monomer before polymerization. The aperture non-refractive device is made from any of the available soft lens materials. Materials which are translucent are useful as the central visual area is in an open aperture. The material surrounding the central hole must provide comfort and the color required to change the apparent color of the eye.

EXAMPLES OF THE COLORANTS:

FD and C Green #6, Leeben Color Blue LA-589, Brown LS-595, Green 16128 and Violet LS-611.

The acid dyes, known as azo dyes, containing nitrogen to nitrogen bonds —N═N— may be used to practice the invention as may the dyes known as reactive dyes and the sulphur dyes. The sulphur dyes are fixed or made fast by removing the sodium sulphide which made the dye soluble. Reactive dyes require no special fixing step, only extraction on unreacted dye, as they react chemically with the material and are thus made permanent. The properties of dyes are well known to the art.

The addition of daylight fluorescent pigments to cosmetic devices for the eye add a new and striking appearance to the eye.

Daylight fluorescent pigments are transparent organic resin particles containing dyes which are capable of fluorescing while in a solid state solution.

Certain substances, especially a number of organic dyes, have the property of fluorescing under visible light at the blue end of the spectrum. The fluorescence of these organic dyes is associated with the individual dye molecules; and in order for them to fluoresce efficiently, they must be dissolved in fairly low concentrations in a solvent for the dyes. Due to the nature of the dyes used, it is necessary to have an organic medium or carrier to put them into solution: and in order to have a pigment, it is necessary that this medium be a solid. The type of material which meets these requirements for a carrier or matrix for the dyes is an organic resin.

The physical structure of the pigments is amorphous, or non-crystalline. In contrast to most other pigments, they are not formed by precipitation and do not consist of particle agglomerates, but rather of individual non-porous particles of various sizes. This and the fact that they are powdered organic resins makes their dispersion in most media relatively easy.

The particle size range of these daylight fluorescent pigments is narrowed by air classification after pulverizing. This results in a product which is practically 100 percent sub-sieve, or finer than 325 mesh (44 microns).

Daylight fluorescent pigments are stable to indoor light or conditions of outdoor light other than direct sunlight.

It is possible to mix more than one fluorescent pigment or colorant in the same formula, to obtain intermediate hues.

The A, AX, T and 6T series fluorescent pigments supplied by Dayglo Corp. of Cleveland, Ohio present no eye toxicity when polymerized in the cosmetic device as representative samples of the product produced no significant eye irritation when applied directly in the eye.

The ability to fluoresce under daylight conditions provides an enhancement of the eye color not previously known or possible.

EXAMPLES OF THE MONOMER MIXTURE:

(1) Ethylene glycol monomethacrylate: 64.8%
Diethylene glycol monomethacrylate: 7.056%
Ethylene glycol dimethacrylate: 0.144%
Water: 20.9%
Ammonium persulfate: 1.1%
2-dimethylaminoethyl acetate: 6.0%
(2) Ethylene glycol monomethacrylate: 54.7%
Diethylene glycol monomethacrylate: 17.2%
Diethylene glycol dimethacrylate: 0.6%
Ammonium persulfate: 1.1%
Dimethylaminoethyl acetate: 5.8%

Low water content hydrophilic materials having a water content 25 to 40 percent water by weight have provided consistently fine results. Low water devices are strong, durable and they resist tearing.

IN THE DRAWING.

Figure 2:
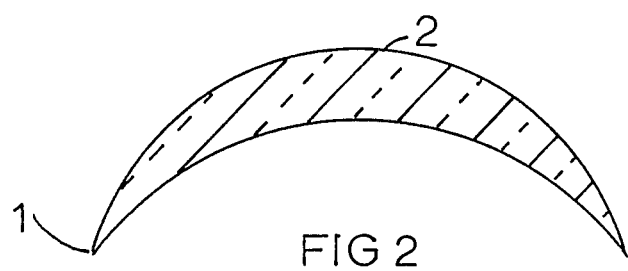
Figure 3:
Figure 4:
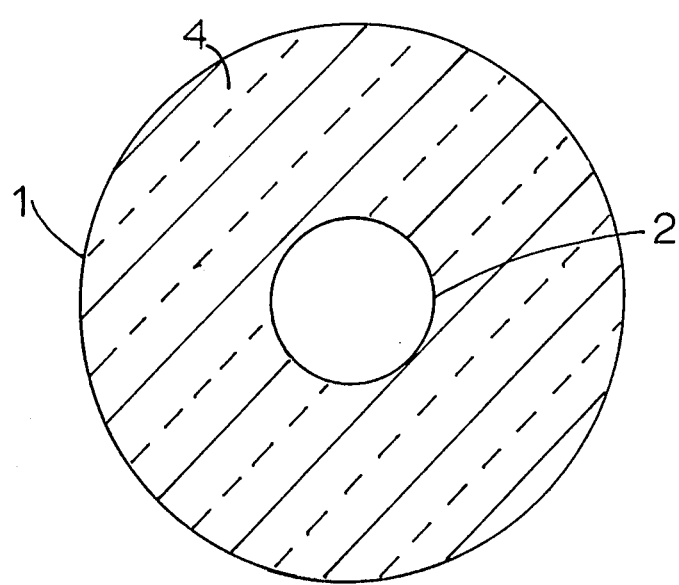

FIG. 1 shows a negative refractive lens in section.
FIG. 2 shows a positive refractive lens in section.
FIG. 3 shows the ocular fluorescent color change device in section.
FIG. 4 shows the ocular fluorescent color change device from the front.

It has been discovered that the conventional fitting techniques used for soft corrective contact lenses cannot be used with the aperture fluorescent color change devices. The same hydrophilic materials may be used however the fitting philosophy cannot be used. Soft refractive contact lenses are fitted having a concave radius longer than the convex radius of the cornea. The corrective soft contact lenses are also fitted with a diameter larger than the cornea. If these parameters are used for the aperture device, the device will not center around the pupil. The soft aperture fluorescent color change device is made having a diameter smaller than the cornea. In fitting the aperture device a diameter of from 10.0 milimeters to 12 milimeters has been found useful with a concave radius from 0.20 milimeter longer to 1.60 milimeters shorter than the cornea.

A corneal curvature of 48.00 diopters has a convex radius of 7.03 milimeters. An aperture cosmetic device having a minimum concave radius of 5.43 milimeters could be used.

A corneal curvature of 39.00 diopters has a convex radius of 8.65 milimeters therefore an aperture cosmetic device having a maximum concave radius of 8.85 could be used. The useful concave radii ranges from 5.43 milimeters to 8.85 milimeters.

THE DEVICE FUNCTIONS AS FOLLOWS

Refractive contact lenses having a negative refractive power have a longer convex radius 2 FIG. 1 and a thick edge 1 FIG. 1.

Positive refractive power contact lenses have a shorter convex radius 2 FIG. 2 and a thin edge 1 FIG. 2. The fluorescent cosmetic non-optical device has a thin edge 1 FIG. 3 and a thin central edge 2 FIG. 3. The midpoint 3 FIG. 3 is thick for stability. The body of the non-optical aperture cosmetic device 4 FIG. 3 and FIG. 4 contains a daylight fluorescent pigment. The daylight fluorescent pigment glows giving off a specific color of light in the presence of daylight illumination.

Maximum fluorescent brightness is not the primary objective, non-fluorescent toning pigments are utilized to obtain strikingly different color effects. The quantity of nonfluorescent colorant must be kept very small (less than 10 percent of the weight of fluorescent pigments).

Best results are usually obtained by mixing adjacent colors in the spectrum. The daylight activated fluorescent pigments are most impressive when used with a translucent hydrophilic material.

The use of daylight fluorescent pigments with conventional contact lenses as in FIGS. 1 or 2 will produce an annoying glow which covers the entire visual field with a colored fog. The open aperture cosmetic device, referred to as the doughnut, produces no visual interference either refractive or chromatic. The ability of the doughnut shaped cosmetic device to radiate light of a specific color when illuminated by daylight white light provides a visibility apparent eye color change.

It is understood that the invention is not limited to the exact details of construction shown and described herein for obvious modifications will occur to persons skilled in the art.

I claim:

1. A non-optical cosmetic device for changing the apparent color of the eye substantially the size of the cornea having an open central visual aperture substantially the size of the pupil of the eye the convex surface being tapered to form a thin inner edge surrounding the central pupil aperture and a colored fluorescent pigment within the device emits light of a preselected color when illuminated by daylight.

2. The subject matter set forth in claim 1 wherein the fluorescent pigment is added to the liquid monomer before the liquid monomer is polymerized to form the device.

3. The subject matter set forth in claim 1 wherein the device is made from a translucent material.

4. The subject matter set forth in claim 1 wherein two or more colorants are added to the device material.

5. A ocular cosmetic device having an open central visual aperture surrounded by a colored daylight fluorescent hydrogel having a diameter of from 10.0 milimeters to 12.0 milimeters and the central visual aperture being from 4.0 milimeters to 7.0 milimeters in diameter, the convex surface being tapered to form a thin edge surrounding the central pupil aperture and a colored daylight fluorescent pigment within the cosmetic device fluoresces when illuminated by daylight.

6. The subject matter set forth in claim 5 wherein the fluorescent pigment is added to the liquid monomer before the liquid monomer is polymerized to form the device.

7. The subject matter set forth in claim 5 wherein the device is made from a translucent material.

8. The subject matter set forth in claim 5 wherein two or more colorants are added to the device material.

9. A cosmetic device for changing the apparent color of the eye substantially the size of the cornea having a central visual aperture substantially the size of the pupil of the eye and a colored dayligh fluorescent pigment within the device radiates light of a preselected color when illuminated by the light of day, said colored daylight fluorescent pigment being amorphous transparent organic resin particles containing a fluorescent dye.

10. The subject matter set forth in claim 9 wherein the fluorescent pigment is added to the liquid monomer before the liquid monomer is polymerized to form the device.

11. The subject matter set forth in claim 9 wherein the device is made from a translucent material.

12. The subject matter set forth in claim 9 wherein two or more colorants are added to the device material.

* * * * *